United States Patent [19]

Ferrando

[11] Patent Number: 5,045,349
[45] Date of Patent: Sep. 3, 1991

[54] SILVER-NICKEL COMPOSITE CATHODES FOR ALKALINE SECONDARY BATTERIES

[75] Inventor: William Ferrando, Arlington, Va.

[73] Assignee: The United States of America as represented by the Secretary of the Navy, Washington, D.C.

[21] Appl. No.: 395,547

[22] Filed: Aug. 16, 1989

[51] Int. Cl.⁵ ............................................. C23C 18/00
[52] U.S. Cl. .................................. 427/113; 427/126.1; 427/205; 427/217
[58] Field of Search ...................... 427/113, 126.1, 205, 427/217

[56] References Cited

U.S. PATENT DOCUMENTS

| | | | |
|---|---|---|---|
| 4,215,190 | 7/1980 | Ferrando | 429/245 |
| 4,242,376 | 12/1980 | Kawasumi | 427/217 |
| 4,341,848 | 7/1982 | Lia | 429/44 |
| 4,440,617 | 4/1984 | Solomon | 429/42 |
| 4,456,521 | 6/1984 | Solomon | 429/42 |
| 4,574,096 | 3/1986 | Ferrando | 427/126.6 |

FOREIGN PATENT DOCUMENTS

| | | | |
|---|---|---|---|
| 565833 | 11/1958 | Canada | 427/113 |
| 9004707 | 1/1974 | Japan | 427/217 |
| 777511 | 6/1957 | United Kingdom | 427/113 |

Primary Examiner—Shrive Beck
Assistant Examiner—Vi Duong Dang
Attorney, Agent, or Firm—Kenneth E. Walden; Roger D. Johnson

[57] ABSTRACT

A method for producing lightweight silver-nickel composite electrodes by (1) infiltrating a graphite fiber plaque with a suspension of finely divided nickel powder in an aqueous solution of $AgNO_3$;
(2) drying the graphite fiber plaque to produce a coating of $AgNO_3$ crystals and nickel particles on the surfaces of the graphite fibers;
(3) heating the coated graphite fiber plaque at a temperature about the melting point of $AgNO_3$ but below the decomposition temperature of $AgNO_3$ until the $AgNO_3$ melts and wets the nickel particles and the surfaces of the graphite fibers; and
(4) heating the molten $AgNO_3$ coated graphite fiber plaque at a temperature from the decomposition temperature of $AgNO_3$ to about 600° C. until the $AgNO_3$ decomposes to form a thin uniform silver metal coating over the nickel particles and the surfaces of the graphite fibers.

The silver-nickel particle coated graphite plaques is electrochemically treated to convert the silver to silver active material ($Ag_2O_2$) and the nickel to nickel active material [$Ni(OH)_2$].

9 Claims, 1 Drawing Sheet

SILVER-NICKEL COMPOSITE CATHODES FOR ALKALINE SECONDARY BATTERIES

BACKGROUND OF THE INVENTION

This invention relates to electrochemical cells and more particularly to composite electrodes for electrochemical cells.

Conventional methods of producing silver electrodes require substantial amounts of costly silver or silver active materials. In a typical example, a paste of $Ag_2O$ and water is applied to a grid of silver or silver plated copper or nickel. After drying the $Ag_2O$ is thermally decomposed to silver metal. The electrode is then anodized to convert the silver metal to silver active material ($Ag_2O_2$). In another type of prior art electrode, a sintered silver plaque is anodized directly to form $Ag_2O_2$ active material.

It would be desirable to provide new lighter weight electrodes using less silver material while operating at voltage close to that of silver.

SUMMARY OF THE INVENTION

Accordingly an object of this invention is to provide new electrodes.

Another object of this invention is to provide a new method of producing electrodes.

A further object of this invention is to provide electrodes which operate at near silver voltages while being lighter weight and using less costly materials.

These and other objects of this invention are accomplished by providing a method for producing lightweight silver-nickel composite electrodes comprising (1) infiltrating a graphite fiber plaque with a suspension of finely divided nickel powder in an aqueous solution of $AgNO_3$ wherein the weight ratio of $AgNO_3$ to nickel is from about 1:6 to 2:1;

(2) drying the graphite fiber plaque to produce a coating of $AgNO_3$ crystals and nickel particles on the surfaces of the graphite fibers;

(3) heating the coated graphite fiber plaque at a temperature about the melting point of $AgNO_3$ but below the decomposition temperature of $AgNO_3$ until the $AgNO_3$ melts and wets the nickel particles and the surfaces of the graphite fibers; and (4) heating the molten $AgNO_3$ coated graphite fiber plaque at a temperature from the decomposition temperature of $AgNO_3$ to about 600° C. until the $AgNO_3$ decomposes to form a thin uniform silver metal coating over the nickel particles and the surfaces of the graphite fibers.

The silver-nickel particle coated graphite plaques is electrochemically treated to convert the silver to silver active material ($Ag_2O_2$) and the nickel to nickel active material [$Ni(OH)_2$].

DETAILED DESCRIPTION OF THE PREFERRED EMBODIMENT

Figure 2:
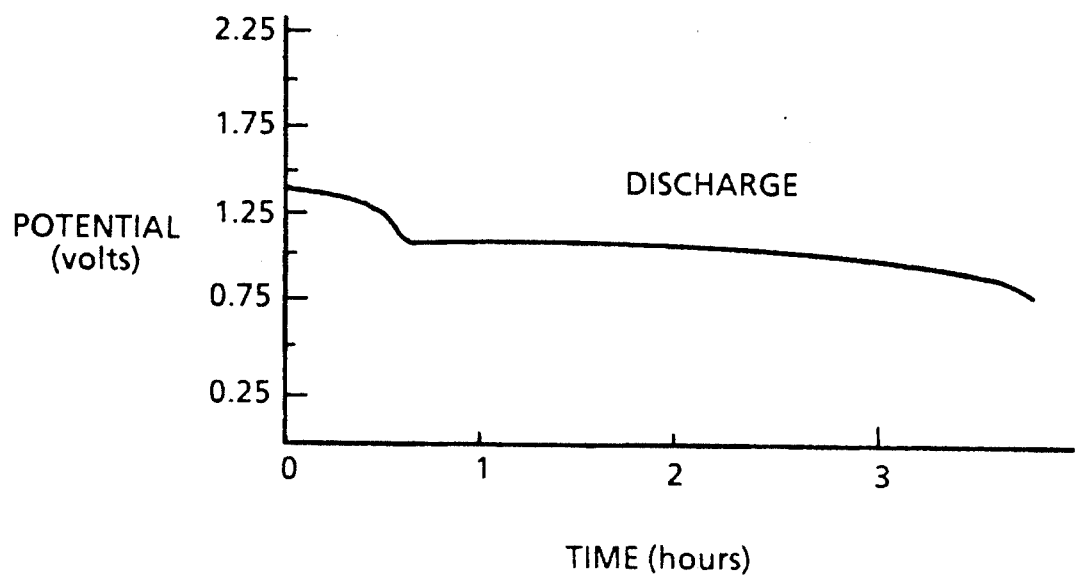
FIGS. 1 and 2 show a charge-discharge profile for a silvernickel/graphite composite after 75 cycles and is discussed in Example 1.

The process of this invention produces a light weight silver-nickel composite electrode comprising a thin, uniform coating of silver-metal over fine particles of nickel powder and the surfaces of a graphite fiber plaque. The silver and nickel are then anodized by conventional processes to produce $Ag_2O_2$ active material and $Ni(OH)_2$ active material.

A key to the present process is the special properties of $AgNO_3$. At 212° C. $AgNO_3$ melts and forms a clear, low vicosity liquid with excellent wetting properties. The molten $AgNO_3$ quickly spreads out to form a uniform coating over the nickel particles and the surfaces of the graphite fibers. The molten $AgNO_3$ also penetrates the surface pores in the graphite fibers. Further, the $AgNO_3$ decomposes at 444° C. leaving a thin uniform coating of silver metal. Because the molten $AgNO_3$ is present in the surface pores of the graphite fibers at decomposition, the resulting silver metal layer will also penetrate those pores, forming a strong bond to the graphite surfaces. Moreover, gases are generated during the decomposition reactions:

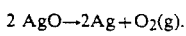

The escaping gases produces a highly porous recticulated silver metal film directly without special treatment processes. Although porous, the silver metal layer covers the graphite fiber surfaces uniformly and binds the nickel particles to them.

The first step of the process is to coat the surfaces of the graphite fibers with nickel powder and $AgNO_3$. This is done by infiltrating the graphite fiber plaque with a supension of fine nickel powder in an aqueous $AgNO_3$ solution. The graphite fiber plaque is then dried leaving a coating of $AgNO_3$ crystals and nickel powder on the surfaces of the graphite fibers. The maximum weight ratio of $AgNO_3$ to nickel in the infiltrating suspension depends partly on the allotted costs of materials while the minimum ratio depends on the need for sufficient silver coating to bind the nickel and nickel active material [$Ni(OH)_2$]to the graphite. The weight ratio of $AgNO_3$ to nickel in the suspension is from about 1:6 to 2:1 and preferable from 1:4 to 1:2.

In the second step of the process, the $AgNO_3$ coated, nickel powder covered graphite fiber plaque is heated at a temperature above the melting point of but below the decomposition temperature of $AgNO_3$ until the $AgNO_3$ melts and wets the nickel particles and the surfaces of the graphite fibers. As a practical matter, this occurs automatically while the $AgNO_3$-coated, nickel powder covered graphite fiber plaque is being heated to the decomposition temperature of $AgNO_3$ For instance, when the $AgNO_3$ crystals melt on the graphite surfaces, the molten $AgNO_3$ seeks to cover as wide an area as possible. As a result, $AgNO_3$ wets the nickel particles and the graphite surfaces forming a uniform coating and penetrating the surface pores of the graphite fibers.

In the third step of the process, the molten $AgNO_3$ is decomposed to form a thin, uniform coating of silver covering the nickel particles and the surfaces of the graphite fibers. The silver-coating has a highly porous recticulated structure. The $AgNO_3$ decomposition step is run at a temperature of from the decomposition temperature of $AgNO_3$ (444° C.) to about 600° C., and preferably from 450° C. to 550° C., and more preferably from 450° C. to 500° C. After the decomposition is complete, the silver metal-coated graphite fiber plaque is cooled to room temperature.

In this process, the $AgNO_3$ is preferably of reagent (ACS) grade so that impurities which would interfer with the process or the operation of the product electrode are not introduced. Similarly, distilled water and high purity nickel powder are also preferred. The nickel powder is preferably 120 mesh or less in size, more preferably 200 mesh or less in size, and still more preferably 325 mesh or less in size.

High density graphite is preferred for this invention because it is more resistant to swelling in the battery electrolyte. The density of the graphite is preferably more than 1.80 g/cm$^3$, more preferably more than 1.90 g/cm3, and still more preferably more than 1.95 g/cm$^3$. The theorectical maximum density for graphite is 2.1 g/cm$^3$. The graphite structure is preferably in the form of a mat or plaque of graphite fibers because of the strength and yet large surface area that a mat or plaque provides. An example of a suitable graphite fiber mat is available from the Union Carbide Corporation, Carbon Products Division under the trademark "Thornel" mat grade VMA. Union Carbide technical information bulletin No. 465-225 describes "Thornel" mat grade VMA as "composed of high-strength, high-modulus carbon or graphite filaments in a random-layered orientation. The fine diametered filaments are one to three inches long and are mechanically bonded to form a continuous web of material 0.4 inches thick, 22 inches wide, that is supplied in rolls approximately 40 feet long." The density of the graphite is 1.99 g/cm$^3$ (0.072 lbs/in$^3$).

The general nature of the invention having been set forth, the following examples are presented as specific illustrations thereof. It will be understood that the invention is not limited to these specific examples but is susceptible to various modifications that will be recognized by one of ordinary skill in the art.

EXAMPLE 1

Figure 1:
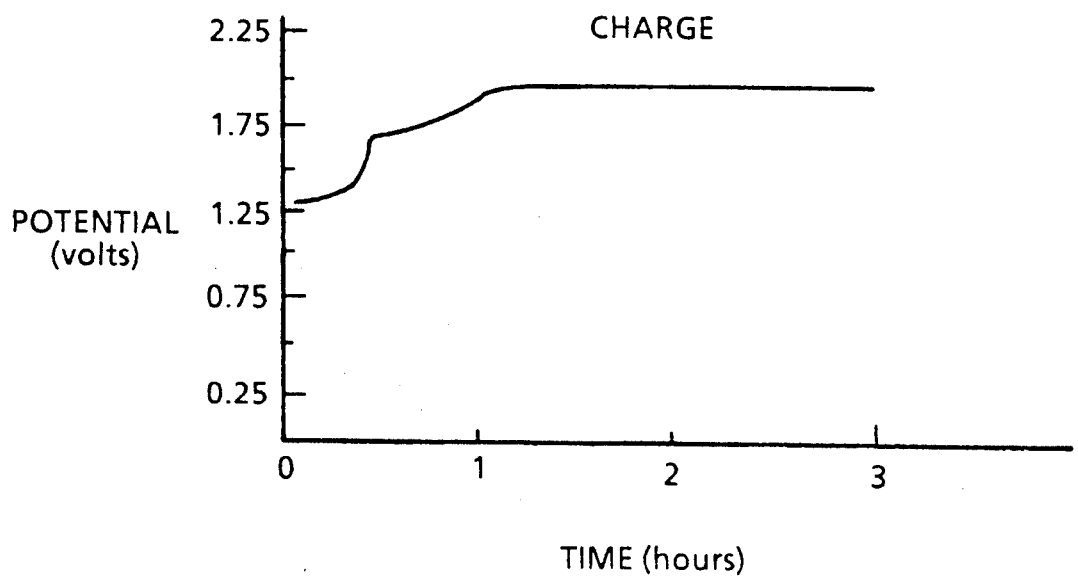

AgNO$_3$ was dissolved in distilled water to near saturation (AgNO$_3$ solubility in cold water approximately 120g/100 ml). A suspension of fine nickel powder (200 mesh) was formed in the AgNO$_3$/water solution. The weight ratio of AgNO$_3$ to nickel in the suspension was 2:1. A graphite mat (pitch mat, VMA grade) was soaked in the suspension mixture and then dried. The mat was then heated to 450° C., during which time the AgNO$_3$ melted and wetted the graphite and the nickel particles. This formed a uniform coating over the graphite and nickel particles. The mat was then heated at 450° C. This step left a porous active mass of finely divided silver coated nickel particles bonded to the graphite mat fibers. A test cell was made by pairing this Ag-Ni coated graphite mat electrode with commercial cadmium negatives. The cell was cycled in a flooded 40 percent KOH electrolyte. Cycling the Ag-Ni graphite mat electrode both oxidizes the silver and hydrolyzes the nickel particles to the electrochemically active species. After about 75 cycles a charge discharge profile shown in FIG. 1 (charge curve) and FIG. 2 (discharge cure) was observed. Active material utilization at this point was approximately 75 percent. Production of nickel hydroxide active material by this method is inherently slow, thus the conversion probably was still incomplete.

EXAMPLE 2

AgNO$_3$ was dissolved in distilled water to near saturation. A graphite mat (pitch mat VMA Grade) was soaked in the AgNO$_3$ solution and then dried. The mat was heated to 450° C., during which time the AgNO$_3$ melted. The molten AgNO$_3$ wetted the graphite forming a uniform coating on the surface of the graphite The mat was heated at 450° C. until the AgNO$_3$ decomposed to form a thin, uniform coating of silver metal over the graphite. The mat was then cooled to room temperature. The silver-coated graphite mat was infiltrated with Ni(OH)$_2$ active material using the conventional method taught in U.S. Pat. No. 4,574,096, titled "Suspension Method for Impregnating Active Material into Composite Nickel Plaque," which issued to William Ferrando on Mar. 4, 1986, herein incorporated by reference. A test cell was made by pairing this electrode with commercial cadmium negatives. The cell was cycled in a flooded 40 percent KOH electrolyte. Unfortunately, this and several other trials in this vein did not produce satisfactory results. Apparently, during charging, the Ag conversion to its oxide leaves the overlaying nickel active material in adequately bonded to the substrate. It tends to migrate in the electrolyte and out of the pores.

Obviously, numerous modifications and variations of the present invention are possible in light of the above teachings. It is therefore to be understood that within the scope of the appended claims the invention may be practiced otherwise than as specifically described herein.

What is claimed is:

1. A method for producing lightweight silver-nickel composite electrodes comprising:
   (1) infiltrating a graphite fiber plaque with a suspension of finely divided nickel powder in an aqueous solution of AgNO$_3$, wherein the weight ratio of AgNO$_3$ to nickel is from about 1:6 to about 2:1;
   (2) drying the graphite fiber plaque to produce a coating of AgNO$_3$ crystals and nickel particles on the surfaces of the graphite fibers;
   (3) heating the coated graphite fiber plaque at a temperature above the melting point but below the decomposition temperature of AgNO$_3$ until the AgNO$_3$ melts and wets the nickel particles and the surfaces of the graphite fibers; and
   (4) heating the molten AgNO$_3$ coated graphite fiber plaque at a temperature from the decomposition temperature of AgNO$_3$ to about 600° C. until the AgNO$_3$ decomposes to form a thin, uniform silver metal coating over the nickel particles and the surfaces of the graphite fibers.

2. The process of claim 1 wherein the weight ratio of AgNO$_3$ to nickel is from 1:4 to 1:2.

3. The process of claim 1 wherein the AgNO$_3$ decomposed in Step (4) at a temperature of from 450° C. to 550° C.

4. The process of claim 3 where the AgNO$_3$ is decomposed in step (4) at a temperature of from 450° C. to 500° C.

5. The process of claim 1 which comprises the additional step of
   (5) anodizing the silver-metal-nickel powder coated graphite fiber plaque to convert the silver metal to silver active material and the nickel metal to nickel active material.

6. The process of claim 5 wherein the silver active material is Ag$_2$O$_2$ and the nickel active material is Ni(OH)$_2$.

7. The process of claim 1 wherein the nickel powder particles are 120 mesh or less in size.

8. The process of claim 7 wherein the nickel powder particles are 200 mesh or less in size.

9. The process of claim 8 wherein the nickel powder particles are 325 mesh or less in size.

* * * * *